US006498417B2

(12) United States Patent
Fuller

(10) Patent No.: US 6,498,417 B2
(45) Date of Patent: Dec. 24, 2002

(54) POWER GENERATION SYSTEM INCLUDING AN APPARATUS FOR LOW TUNING A GENERATOR STATOR CORE UPON ATTACHMENT TO A FRAME SUPPORT AND ASSOCIATED METHODS

(75) Inventor: Robert Fuller, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 8 days.

(21) Appl. No.: 09/740,323

(22) Filed: Dec. 18, 2000

(65) Prior Publication Data

US 2002/0074894 A1 Jun. 20, 2002

(51) Int. Cl.⁷ .................................................. H02K 5/00
(52) U.S. Cl. ............................. 310/258; 310/91; 310/51
(58) Field of Search .......................... 310/91, 258, 217, 310/43, 64, 270, 271, 259, 254, 260; 29/596, 732

(56) References Cited

U.S. PATENT DOCUMENTS

| | | | | |
|---|---|---|---|---|
| 1,428,889 A | * | 9/1922 | Johnson | 310/258 |
| 1,480,312 A | * | 1/1924 | Stratton | 310/258 |
| 2,112,747 A | * | 3/1938 | Wood | 310/258 |
| 2,199,141 A | | 4/1940 | Rice | 171/252 |
| 2,424,299 A | * | 7/1947 | Baudry et al. | 310/258 |
| 2,811,659 A | | 10/1957 | Barlow et al. | 310/258 |
| 2,846,603 A | | 8/1958 | Webster et al. | 310/258 |
| 2,973,442 A | | 2/1961 | Wilson | 310/258 |
| 3,531,667 A | | 9/1970 | Barton et al. | 310/51 |
| 3,708,707 A | | 1/1973 | Kranz | 310/258 |
| 3,772,542 A | | 11/1973 | Hallerback | 310/50 |
| 4,051,399 A | | 9/1977 | Stanwick et al. | 310/51 |
| 4,145,626 A | | 3/1979 | Aroshidze et al. | 310/91 |
| 4,425,523 A | | 1/1984 | Detinko et al. | 310/258 |
| 4,469,973 A | | 9/1984 | Guyot et al. | 310/258 |
| 4,536,671 A | * | 8/1985 | Miller | 310/258 |
| 4,891,540 A | | 1/1990 | Cooper et al. | 310/254 |
| 4,975,613 A | * | 12/1990 | Brem et al. | 310/258 |
| 6,091,177 A | | 7/2000 | Carbonell et al. | 310/91 |

OTHER PUBLICATIONS

ABB Review, Jan. 1996, "New air–cooled turbogenerator in the 300–MVA class" Jan. 1996.
Westinghouse Figure 1.1 Aug. 1990.
Westinghouse Figure 9.4 Aug. 1990.
Westinghouse Figure 9.5 Jul. 1990.

* cited by examiner

Primary Examiner—Tran Nguyen

(57) ABSTRACT

A power generation system (10) including an apparatus for attaching a generator stator core (20) to a frame support (30) and associated methods are provided. The system (10) preferably includes a stator core frame support member (30) and a generator stator core (20) including a plurality of keybars (22) positioned spaced-apart and extending along outer peripheral portions of the generator stator core (20). The generator stator core (20) is positioned to overlie the stator core frame support member (30). The system (10) further includes a core supporter (40) connected to the stator core frame support member (30) and positioned to contact the generator stator core (20). The core supporter (40) includes first (43) and second (44) core connectors (42) for low tuning the natural frequency of a generator stator core (20) and for stabilizing the power generation system during operation. The method of stabilizing the power generation system (10) during operation includes attaching first (43) and second (44) core supporters (42) along a stator core frame support (30) and positioning the generator stator core (20) to overlie the stator core frame support (30). The method also includes connecting the generator stator core (20) to the first (43) and second (44) core supporters (42) so that a connection is made between the generator stator core (20) and the stator core frame support (30).

25 Claims, 7 Drawing Sheets

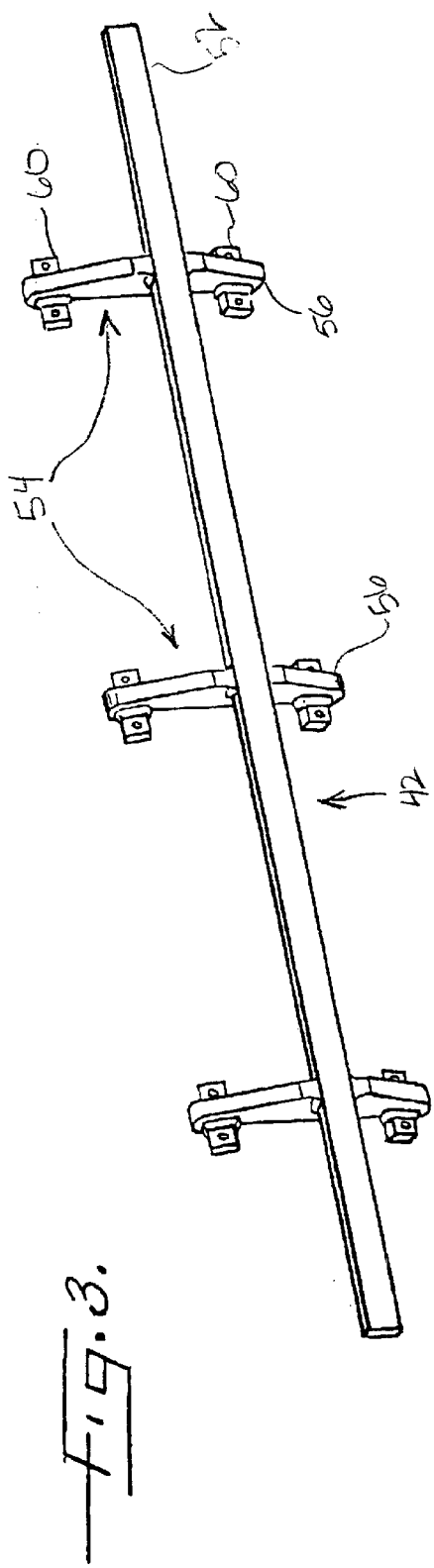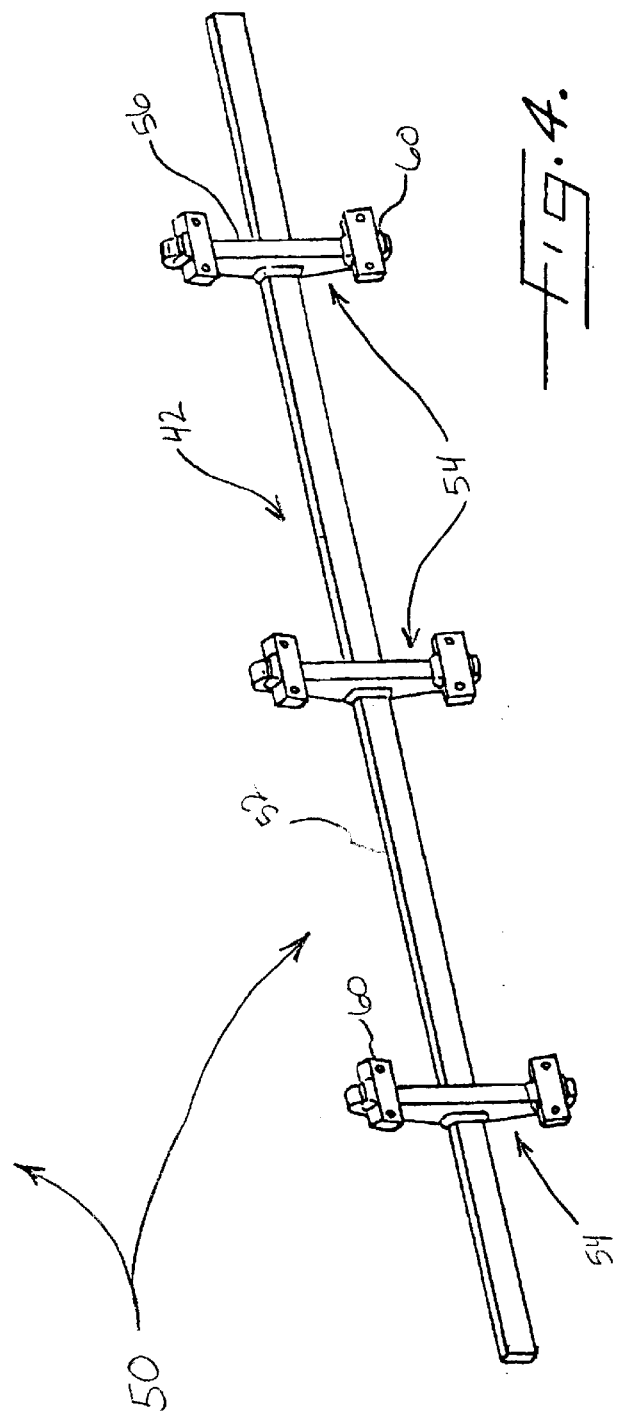

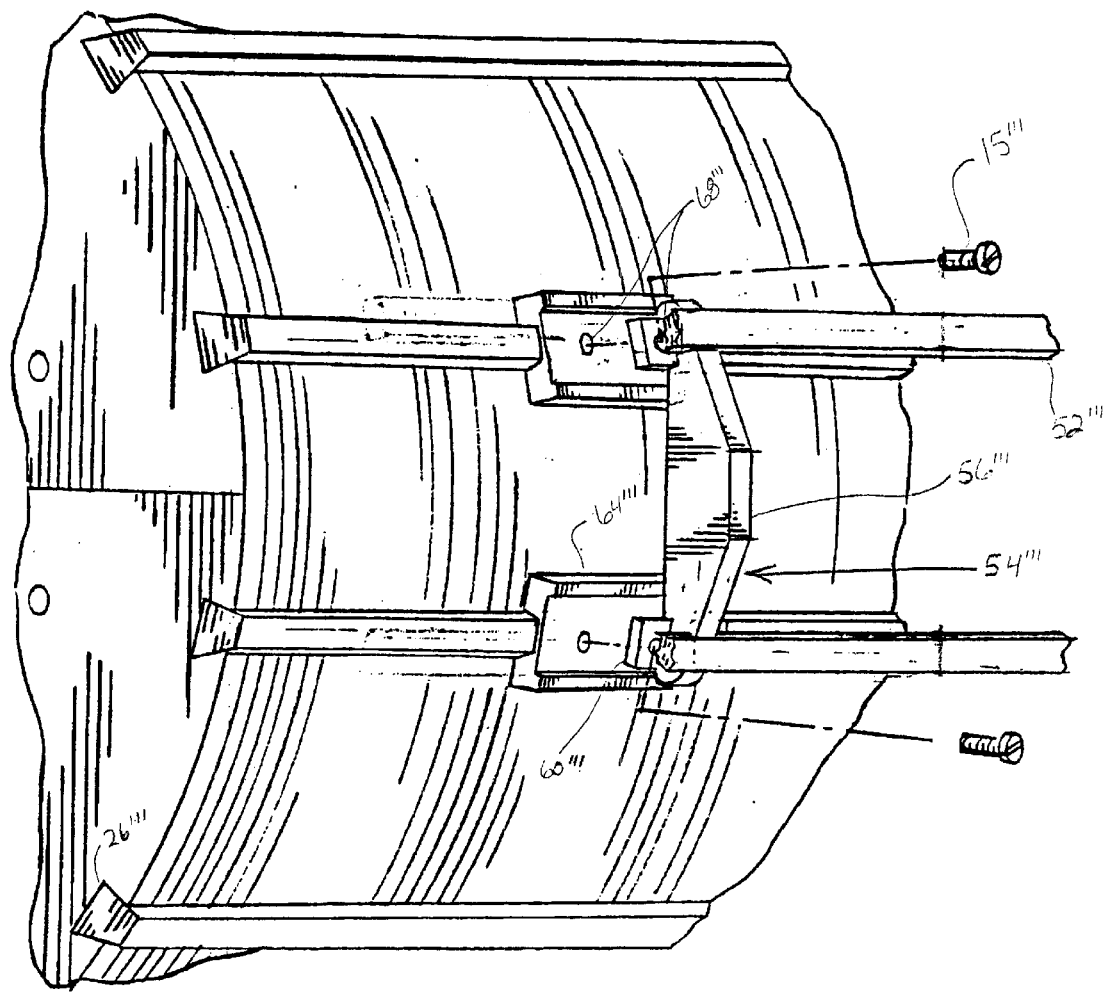
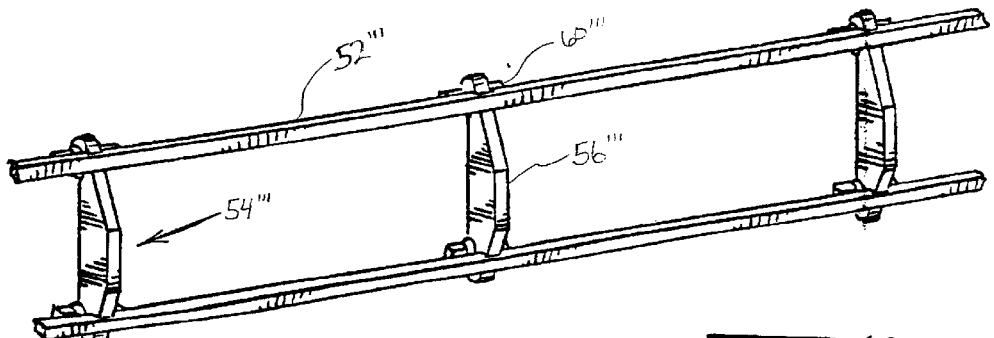

POWER GENERATION SYSTEM INCLUDING AN APPARATUS FOR LOW TUNING A GENERATOR STATOR CORE UPON ATTACHMENT TO A FRAME SUPPORT AND ASSOCIATED METHODS

RELATED APPLICATIONS

The application is related to U.S. patent application Ser. No. 09/740,322 filed on Dec. 18, 2000 by the same inventor which is incorporated herein by reference in its entirety.

FIELD OF THE INVENTION

This invention is related to the power generation industry and, more particularly, to the field of mounting frames supporting stator cores.

BACKGROUND OF THE INVENTION

In the power generation industry, generator stator cores are supported on mounting frames. As is known in the art, generator stator cores generally include keybars positioned along an outer peripheral surface of the generator stator core. During operation of a power generation system, the generator stator core experiences an "oval mode" condition during which the generator stator core cyclicly deforms. The generator stator core temporarily deforms into an oval shape during operation. The deformations take place along both the horizontal and vertical axis. The "oval mode" condition experienced by the generator stator core accounts for some of the tangential and radial forces on a power generation system. Manufacturers of power generation systems are often faced with the problem of designing an efficient stator core frame support that can compensate for the "oval mode" condition experience by the generator stator core during operation. Current frame supports are very large and inefficient.

Power generation systems also experience transient faults during operation. When the power generation system experiences a transient fault, the generator stator core is suddenly displaced or rotated and it is difficult for a frame or frame support to sustain the forces associated with the transient fault. Manufacturers and users of high voltage generator stator cores often have great difficulty providing an efficient support for the generator stator core. In order to provide a frame support that is sufficient enough to sustain the forces associated with transient faults experienced during operation of the generator stator core, the frame support is normally very large and extremely inefficient.

Current power generation systems conventionally provide generator stator cores that have a higher tuned natural frequency. A generator stator core having a higher tuned natural frequency makes the power generation system more expensive and complex. A less stable power generation system requires a large core supporter that is also not cost effective and extremely inefficient.

Some generator stator core support frames incorporate an outer frame surrounding the core that is then attached to a bedplate or lower frame such as seen in U.S. Pat. No. 6,091,177 by Carbonell et al. titled "Spring Mounting For An Electric Generator." The mounting frame surrounds the core and connects to all of the keybars positioned on the outer peripheral portions of the core. The surrounding frame is then attached to a lower frame using side and lower connecting members. The combination of these connecting members provides a support frame that is inefficient and cumbersome. Furthermore, the combination of the surrounding frame and the support frame provides a support apparatus with an increased load path, i.e., the load from transient faults and vibratory forces must travel an increased distance.

A similar arrangement for such an apparatus can be found in U.S. Pat. No. 4,891,540 by Cooper et al. titled "Generator Core Support System." This support system connects to the generator stator core around the outer periphery of the generator stator core where the keybars are positioned. Similarly, the support system provides a complex and inefficient connection between the generator stator core and the support frame. This rigid connection does not relieve lateral and tangential forces associated with transient faults. Accordingly, excess force from transient faults can cause damage to the generator stator core and frame if the core is not properly fastened to a frame support that can withstand these forces.

As understood by those skilled in the art, it is common to support a power generator stator core on a support frame that includes a connecting member between the generator stator core and the frame support in the six o'clock or twelve o'clock positions, i.e., a connecting member between the lower outer portion of the generator stator core and the stator core frame support. It is also common to support a power generator stator core on a support frame that includes a connecting member between the generator stator core and the frame support in the twelve o'clock position, i.e., a connecting member between an upper outer portion of the generator stator core and the stator core frame support. These configurations of frame supports provide inefficient connections that do not allow for the elimination of lateral forces associated with transient faults that occur during operation.

Additionally, it is costly and time consuming to provide support systems for power generators due to the cumbersome size and configuration of the current support frames necessary for accommodating transient faults and the oval mode experienced by power generation systems during operation. Some current support systems are so cumbersome that it is not possible to assemble the core and the core support system separate from one another. Presently, the core and the core support system must be constructed simultaneously. The simultaneous construction of the core and the support frame is extremely costly and time consuming.

SUMMARY OF THE INVENTION

In view of the foregoing, the present invention advantageously provides a high voltage power generation system including an apparatus for attaching a generator stator core to a frame support and methods of stabilizing a power generation system, reducing vibration and eliminating lateral movement of a generator stator core, low tuning the natural frequency of the generator stator core during operation, and compensating for an "oval mode" condition that occurs during operation of the power generation system that are efficient and cost effective. More particularly, the present invention advantageously utilizes spring supports to allow for a generator stator core to be supported by a generator stator core frame support in a manner that eliminates any rigid connections in the power generation system. The present invention also advantageously provides an apparatus and methods for protecting a power generation system from the forces associated with transient faults. The present invention further advantageously compensates for temporary deformations that result in radial and tangential forces that are encountered when the generator stator core experiences an "oval mode" condition during operation. The present invention still further advantageously compensates for the stresses applied to a power generation system associated with a generator stator core having a high tuned natural frequency by low tuning the natural frequency of the generator stator core.

More particularly, the present invention provides a power generation system that includes a stator core frame support member having a lower inner surface portion and a lower outer surface portion. The lower inner surface portion, for example, can have a substantially semi-annular shape. The lower outer surface portion is positioned to contact a support surface. The system also includes a generator stator core that can likewise have a substantially annular shape. The generator stator core preferably includes a plurality of keybars positioned spaced-apart and extending along the outer peripheral portions. The generator stator core is positioned to overlie the lower inner surface portion of the stator core frame support member and has a lower end portion positioned spaced-apart from and not in contact with bottom portions of the lower inner surface of the stator core frame support member. The upper end portion of the generator stator core is also positioned spaced-apart from and not in contact with the stator core frame support.

The system further includes a core supporter connected to the stator core frame support member. The core supporter is positioned to contact a plurality of keybars that are positioned along outer side peripheries of the generator stator core. The core supporter preferably has first and second core connecting means for attaching the stator core frame support member to the generator stator core. The core connecting means relieves vibration and prevents lateral movement of the generator stator core, low tunes the natural frequency of the generator stator core, and stabilizes the power generation system during operation to thereby provide a stator core frame support member that is efficient and cost effective. The first core connecting means preferably is connected to a first medial side outer peripheral portion of the generator stator core and the second core connecting means preferably is connected to a second medial side outer peripheral portion of the generator stator core. The second medial side outer peripheral portion of the generator stator core is positioned opposite the first medial side outer peripheral portion of the generator stator core. The first and second core connecting means are positioned substantially symmetrical along the longitudinal axis of the generator stator core. The combination of the first and second core connecting means connect portions of the stator core frame support member to portions of the generator stator core.

This configuration of a the generator stator core and the stator core frame support low tunes the natural frequency of the generator stator core and provides a more stable power generation system. This configuration also advantageously relieves vibration and prevents lateral movement of the generator stator core associated with transient faults that occur during operation. This configuration still further advantageously compensates for tangential and radial forces encountered by the power generation system when the generator stator core experiences the "oval mode" condition. By relieving vibration and eliminating lateral movement of the generator stator core and by further stabilizing the power generation system, a smaller and more efficient generator stator core frame support member is provided.

The present invention relieves vibration and prevents lateral movement of the generator stator core by providing a plurality of connections between the generator stator core and the stator core frame support member along medial side portions of the generator stator core and not bottom or top peripheries of the generator stator core. The power generation system is further stabilized by eliminating a support contact between a bottom portion of the generator stator core and the stator core frame support and by eliminating a support contact between a top portion of the generator stator core and the stator core frame support. These configurations of the power generation system advantageously eliminate lateral force components associated with transient faults, reduce vibratory forces associated with operation of the generator stator core, low tune the natural frequency of the generator stator core, stabilizes the power generation system, and further advantageously reduce costs and time associated with providing a support frame for a high voltage generator stator core. These configurations of the power generation system also advantageously compensate for temporary deformations of the power generation stator core when the generator stator core experiences an "oval mode" condition during operation.

The present invention still further provides a generator stator core support apparatus for relieving vibration and eliminating lateral movement of the generator stator core during operation, low tuning the natural frequency of the generator stator core, and stabilizing the power generation system. The generator stator core support apparatus preferably includes first core connecting means for connecting the generator stator core to a stator core frame support when the generator stator core is positioned to overlie lower inner surface portions of the stator core frame support. The first core connecting means preferably is positioned to contact a first outer peripheral medial side portion of the generator stator core and to contact a first upper medial side portion of the stator core frame support. The generator stator core support apparatus also includes second core connecting means for connecting the generator stator core to the stator core frame support. The second core connecting means preferably is positioned to contact a second outer peripheral medial side portion of the generator stator core. The second outer peripheral medial side portion is positioned opposite the first outer peripheral medial side portion of the generator stator core. The second core connecting means is further positioned to contact a second upper medial side portion of the stator core frame support. The second medial side portion of the stator core frame support is positioned opposite the first medial side portion of the stator core frame support.

The combination of the first and second core connecting means connects portions of the generator stator core to portions of the stator core frame support to thereby low tune the natural frequency of the generator stator core, stabilize the power generation system, relieve vibration, and prevent lateral movement of the generator stator core during operation. The combination of the first and second core connecting means is further positioned to support the generator stator core when connected thereto without a support contact between an upper or lower end portion of the generator stator core and the stator core frame support. There is no longer a stiff support between the generator stator core and the stator core frame support when the connecting support is eliminated between the lower end portion or the upper end portion of the generator stator core and the stator core frame support.

By providing an interstitial space between the upper and lower end portions of the generator stator core and the inner surface portions of the stator core frame support, lateral forces associated with transient faults that occur during operation of the generator stator core are eliminated. This interstitial space also relieves vibration of the generator stator core during operation and compensates for temporary deformations that produce tangential and radial forces encountered by the generator stator core when experiencing an "oval mode" condition during operation. By low tuning the natural frequency of the generator stator core, relieving vibration, eliminating lateral movement, stabilizing the power of generation system and compensating for the "oval mode" condition, the present invention advantageously decreases the load from the generator stator core to the stator core frame support. The decreased load allows for a smaller and more efficient stator core frame support. A smaller frame advantageously provides a shorter load path along which the load from the generator stator core to the stator core frame support must travel. This configuration further advantageously reduces costs and time associated with providing a support frame for a high voltage generator stator core thereby providing an efficient stator core frame support.

The present invention also provides a method of stabilizing a power generation system, relieving vibration, eliminating lateral movement and low tuning the natural frequency of the generator stator core during operation. The method includes the step of attaching a first core supporter which has a biasing support member that includes an elongate spring bar to a first upper medial side portion of a stator core frame support. The method also includes attaching a second core supporter which also has a biasing support member with an elongate spring bar to a second upper medial side portion of the stator core frame support. The second upper medial side portion is positioned opposite the first upper medial side portion so that the combination of the first and second core supporters are positioned substantially symmetrical along portions of the frame support. The method further advantageously includes positioning the generator stator core to overlie lower inner surface portions of the stator core frame support, connecting the generator stator core to the first core supporter along a first medial side portion of the generator stator core, and connecting the second core supporter to a second medial side portion of the generator stator core. The second medial side portion is preferably positioned opposite the first medial side portion of the generator stator core, and the combination of the connections between the first and second core supporters and the first and second medial side portions of the generator stator core form a connection between the generator stator core and the stator core frame support. The connection between the generator stator core and the stator core frame support advantageously reduces vibration and eliminates lateral forces experienced by the generator stator core, low tunes the natural frequency of the generator stator core, and provides stabilization to the power generation system during operation without a support contact between an upper or lower end portion of the generator stator core and the stator core frame support.

The method of stabilizing the power generation system provided by the present invention advantageously reduces the cost associated on constructing power generation systems. The method further advantageously reduces the time associated with constructing a frame support to low tune the natural frequency of the generator stator core and stabilize the power generation system. The method also advantageously eliminates lateral force components and vibration forces associated with transient faults during operation of the high voltage generator stator core. The method still further advantageously provides a stator core frame support that is efficient, cost effective, and can compensate for the vertical and horizontal force components associated with the "oval mode" condition experienced by the generator stator core during operation. The method also advantageously decreases the path along which a load must travel between the generator stator core and the stator core frame support.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 3 is a front perspective view of a core connector that includes a spring bar, spring mounting frames, and bracket spring assemblies according to a first embodiment of the present invention;

FIG. 4 is a rear perspective view of a core connector that includes a spring bar, spring mounting frames, and bracket spring assemblies according to a first embodiment of the present invention;

FIG. 9 is a fragmentary perspective view of a third embodiment of a core connector and the generator stator core according to a fourth embodiment of the present invention; and FIG. 10 is a front perspective view of third embodiment of a core connector including a plurality of spring bars according to a fourth embodiment of the present invention.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime, double prime, and triple prime notations, if used, indicate similar elements in alternative embodiments.

During operation of power generation systems, high voltage generator stator cores experience vibration forces, transient faults, and an "oval mode" condition that includes both tangential and radial forces applied to the power generation system. Transient faults cause the high voltage generator stator core to displace and further put high strains on stator core frame support members during operation. The lateral displacement of the generator stator core, for example, can be of the same order of magnitude as torsional displacements due to torsional forces experienced by the generator stator core during operation. The displacements, high vibratory forces, and tangential and radial forces associated with the "oval mode" condition experienced by generator stator cores during operation cause high levels of strain on stator core frame support members positioned to support the generator stator core. By low tuning the natural frequency of the generator stator core, the power generation system is advantageously reduced in size, complexity and cost.

Figure 1:
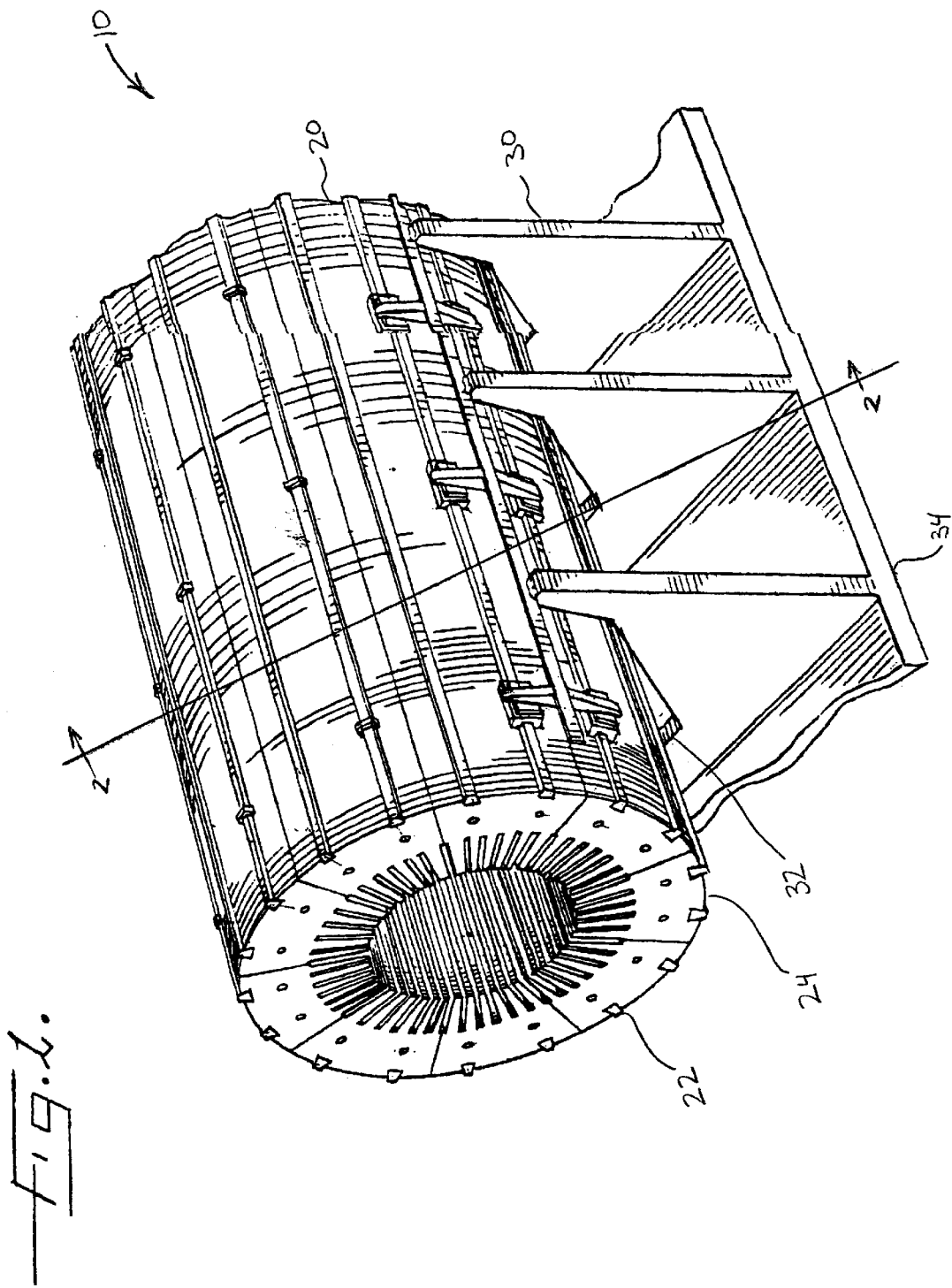
FIG. 1 is a fragmentary perspective view of a power generation system according to a first embodiment of the present invention.

FIG. 1 illustrates a power generation system 10 that reduces vibratory forces and eliminates lateral force components associated with transient faults and reduces tangential and radial forces associated with the "oval mode" condition and low tunes the natural frequency of a generator stator 20 during operation. The power generation system 10 includes a stator core frame support member 30 having a lower inner surface portion 32 and a lower outer surface portion 34. The lower outer surface portion 34 is positioned to rest on a support surface, such as a concrete floor, for example. The lower inner surface portion 32 of the stator core frame support 30 preferably has a substantially semi-annular shape, but other shapes, e.g., rectangular or oval, could also be used as well according to the present invention.

The generator stator core 20 can have a substantially annular shape, but other shapes could also be used as well according to the present invention. The generator stator core 20 preferably includes a plurality of keybars 22. The keybars 22 can advantageously be made of a steel material. The plurality of keybars 22 are preferably positioned spaced-apart and extend along outer peripheral portions of the generator stator core 20. The generator stator core 20 is positioned to overlie the stator core frame support member 30 and can advantageously include substantially less than the maximum number of keybars that can be positioned spaced-apart along outer peripheral portions of the generator stator core 20.

Figure 6:
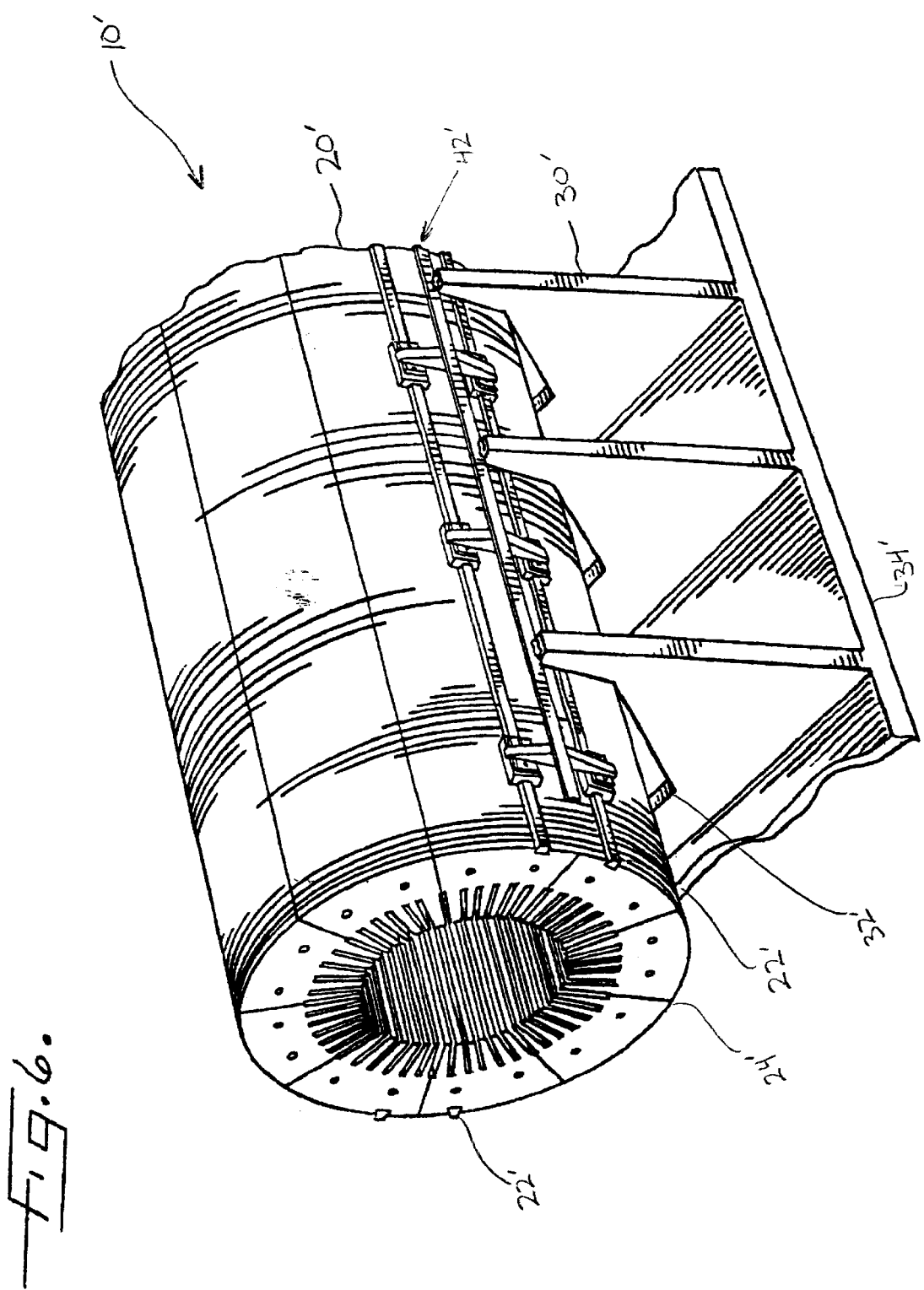
FIG. 6 is a fragmentary perspective view of a power generation system according to a second embodiment of the present invention.

In a second embodiment of the present invention, the generator stator core 20' can still further advantageously include four keybars 22', as illustrated in FIG. 6. Two keybars 22' can be positioned spaced-apart along a first outer peripheral medial side portion 27' of the generator stator core 20', and another two keybars 22' can be positioned spaced-apart along a second outer peripheral medial side portion 28' of the generator stator core 20'. The first 27' outer peripheral medial side portion is positioned opposite the second 28' outer peripheral medial side portion of the generator stator core 20' so that the first 27' and the second 28' outer peripheral medial side portions are positioned substantially symmetrical along a preferably longitudinal axis of the generator stator core 20'.

The keybars 22 are elongate and extend substantially the entire length of the generator stator core 20. The outer periphery of the generator stator core 20 is preferably provided with dovetail slots 26 that extend substantially the entire length of the generator stator core 20. The dovetail slots 26 are wider at the bottom portion of the slots 26 and more narrow at the upper portion of the slots 26. Each of the plurality of keybars 22 has portions shaped similar to the dovetail slots 26. Likewise, the inner portions of the keybars 22 are preferably wider than the outer portion of the keybars 22. The keybars 22 matingly contact the respective dovetail slots 26 formed in the outer peripheries of the generator stator core 20.

The power generation system 10 further provides a core supporter connected to the stator core frame support member 30. The core supporter is further positioned to contact the keybars 22 positioned along outer peripheral portions of the generator stator core 20. The core supporter preferably includes core connecting means 42 for attaching the stator core frame support member 30 to the generator stator core 20. The core connecting means preferably includes first 43 and second 44 core connecting means. Each of the first 43 and second 43 core connecting means preferably includes a biasing support member 50. The biasing support member 50 encompasses structural properties that provide strength for supporting a connection between the generator stator core 20 and the stator core frame support member 30. The biasing support member 50 also includes structural properties that provide a supporting connection between the generator stator core 20 and the stator core frame support member 30 that is not rigid. The biasing support member 50 further provides a level of flexure that reduces vibration of the generator stator core 20, eliminates lateral force components associated with transient faults that occur during operation of the generator stator core 20 and low tunes the natural frequency of the generator stator core 20.

The structural properties of the biasing support ember 50 also advantageously aid in reducing tangential and radial forces associated with the "oval mode" condition experienced by the generator stator core 20 during operation to thereby reduce complexity and cost of the power generation system 10 while simultaneously maintaining stability of the power generation system 10. The biasing support member 50 can advantageously be provided by an elongate spring bar 52. The spring bar 52 is positioned between the generator stator core 20 and the stator core frame support member 30 to thereby provide a connector assembly that connects the generator stator core 20 and the stator core frame support member 30.

Figure 5:
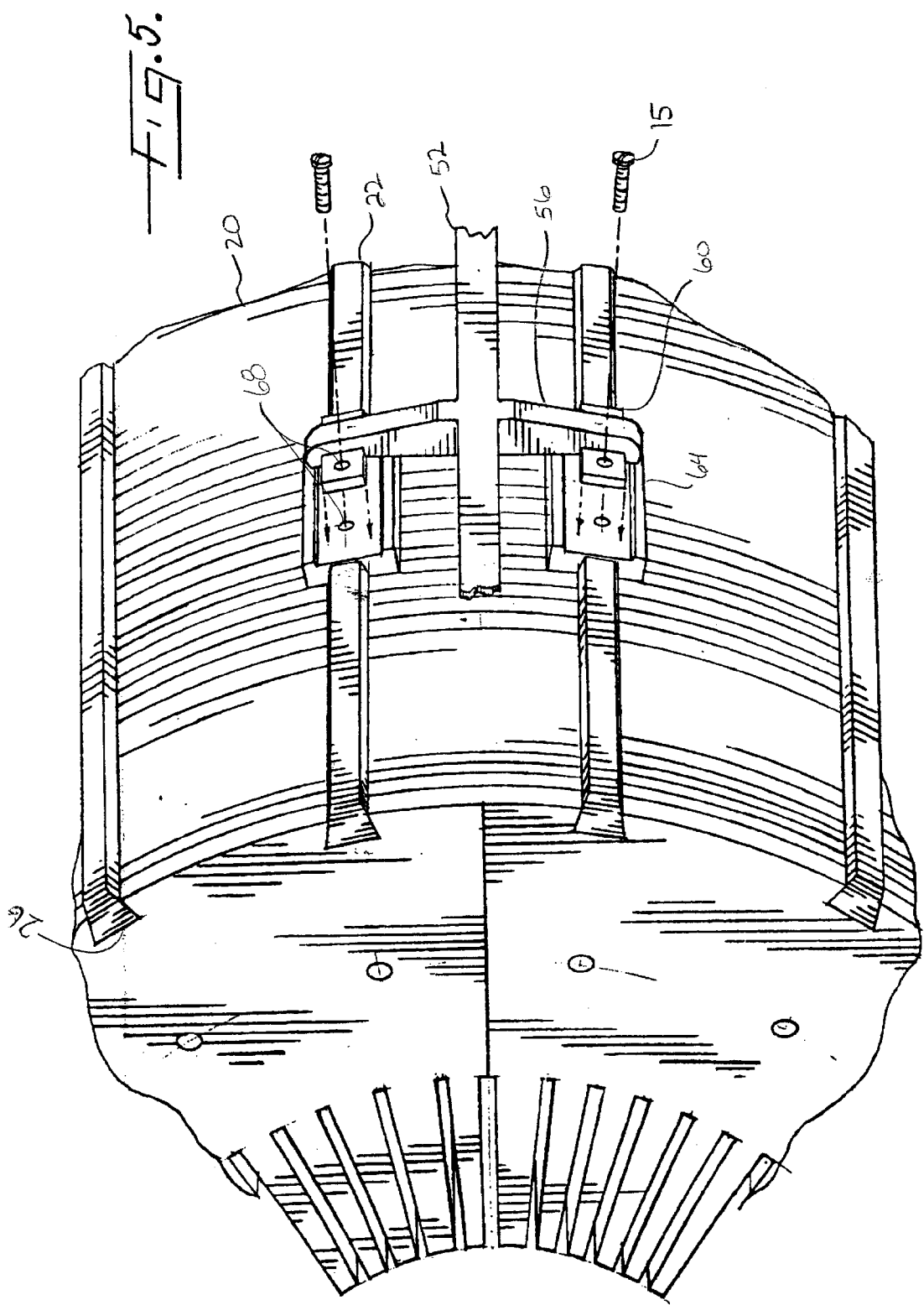
FIG. 5 is a fragmentary perspective view of a core connector and the generator stator core according to a first embodiment of the present invention.

The connector assembly is structurally viable and has flexural properties sufficient to absorb vibratory forces, eliminate lateral force components associated with transient faults, low tune the natural frequency of the generator stator core, and stabilize the power generation system 10 during operation of the generator stator core 20. More particularly, the spring bar 52 is connected to a spring mounting frame 56. The spring mounting frame 56 is connected to the keybars 22 of the generator stator core 20 as illustrated in FIG. 5. The spring bar 52 can be composed of steel or another type of material that provides structural support and flexural properties suitable for relieving vibration of a generator stator core 20, eliminating lateral force components associated with transient faults, reduce tangential and radial force components associated with the "oval mode" condition, and low tune the natural frequency of the generator stator core 20 during operation. The flexural properties of the spring bar 52 also advantageously aid in eliminating rigid connections in power generation systems 10.

The first 43 and second 44 core connecting means advantageously relieve vibratory, tangential and radial forces associated with operation of the generator stator core 20, eliminate lateral movement, low tune the natural frequency of the generator stator core 20, and further advantageously stabilize the power generation system 10. The first core connecting means 43 is connected to a first medial side outer peripheral portion 27 of the generator stator core 20. The second core connecting means 44 is connected to a second medial side outer peripheral portion 28 of the generator stator core 20. The first medial side outer peripheral portion 27 of the generator stator core 20 is positioned opposite the second medial side outer peripheral portion 28 of the generator stator core 20 and is therefore positioned substantially symmetrical along the longitudinal axis of the generator stator core 20. The combination of the first 43 and second 44 core connecting means connect portions of the generator stator core 20 to portions of the stator core frame support member 30.

The biasing support member 50 can also advantageously include a plurality of bracket spring assemblies 54. The spring bar 52 is advantageously connected to the bracket spring assembly 54 as illustrated in FIGS. 3–5. The bracket spring assemblies 54 can be positioned spaced-apart along the elongate spring bar 52. Each of the plurality of bracket spring assemblies 54 also includes a spring mounting frame 56 and a plurality of spaced-apart key block brackets 60. The spring bar 52 connects to each of the plurality of bracket spring assemblies 54 along center portions of the bracket spring assemblies 54. More particularly, the spring bar 52 is positioned to connect to outer center portions of each of the plurality of bracket spring assemblies 54. The spring bar 52 can connect to the bracket spring assemblies 54 by welding exterior portions of the bracket spring assemblies 54 to portions of the spring bar 52. The spring bar 52 can also connect to the bracket spring assemblies 54 using any other type of connection that can be made between metals that has the structural and flexural properties to reduce vibration and eliminate lateral forces of the generator stator core 20 and to further stabilize the power generation system 10 during operation.

Figure 7:
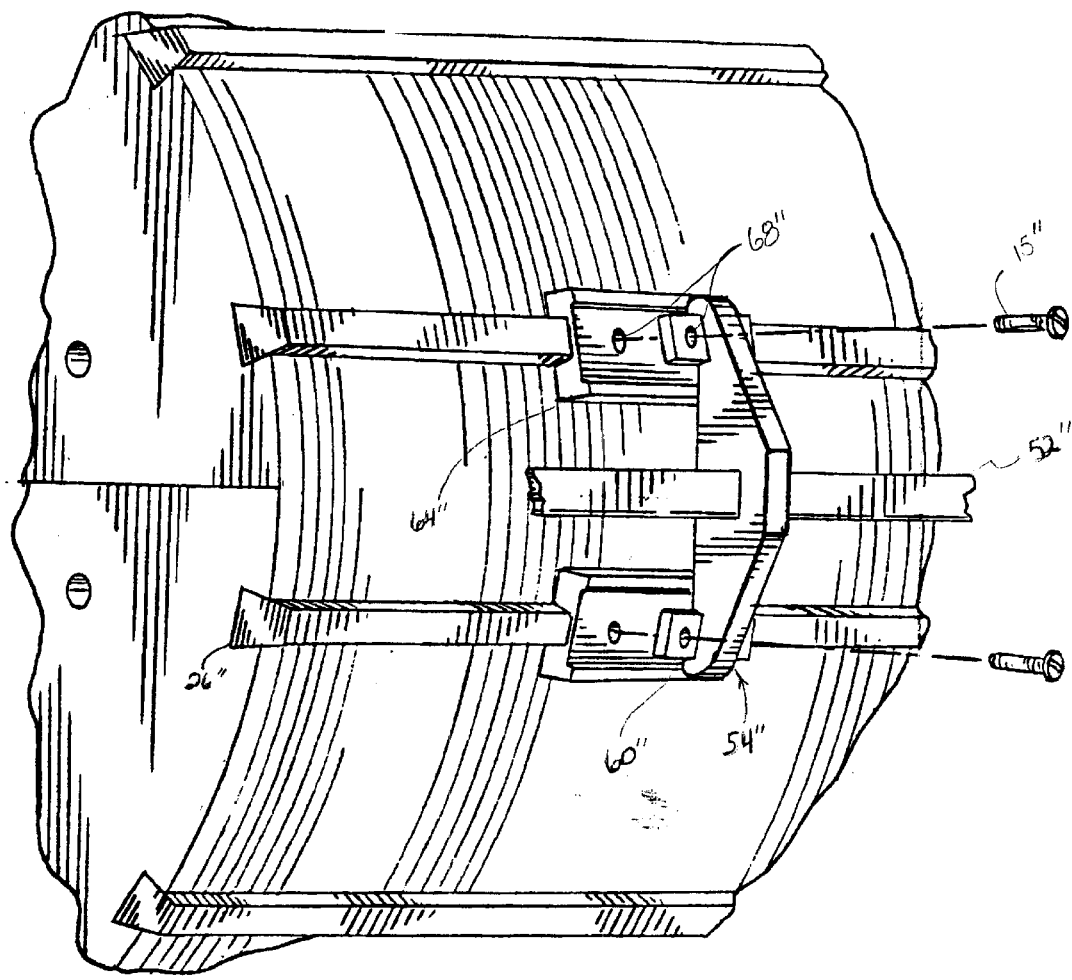
FIG. 7 is a fragmentary perspective view of a second embodiment of a core connector and the generator stator core according to a third embodiment of the present invention.
Figure 8:
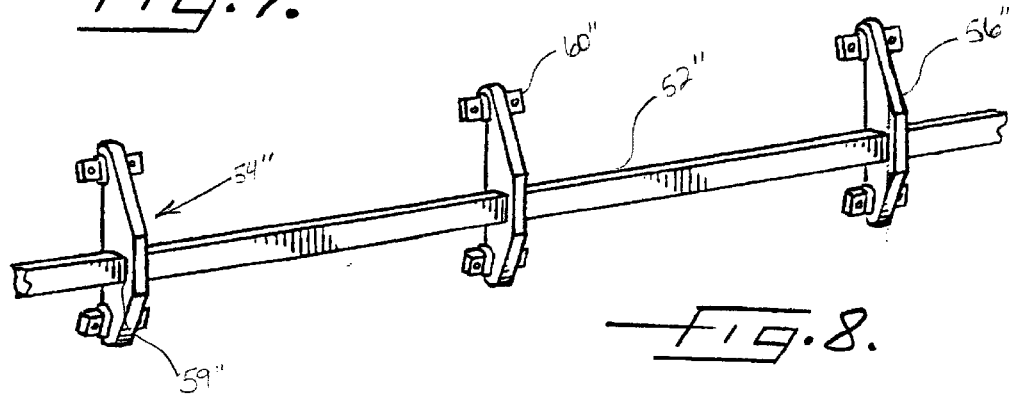
FIG. 8 is a front perspective view of a second embodiment of a core connector that includes a spring bar passing through spring mounting frames with bracket spring assemblies according to the present invention.

In a third embodiment of the present invention, the spring bar 52" can connect to the bracket spring assemblies 54" through a center portion of the bracket spring assemblies 54" as illustrated in FIGS. 7–8. In this embodiment, the bracket spring assemblies 54" include an opening 59" formed in a medial portion. The dimensions of the opening 59" are substantially similar to the dimensions of the spring bar 52". A connection is made between the spring bar 52" and the bracket spring assemblies 54" by slidably engaging the elongate spring bar 52" with the opening 59" formed in each of the plurality of bracket spring assemblies 54". The connection between the spring bar 52" and the bracket spring assemblies 54" can be strengthened by welding portions of the spring bar 52" to portions of the bracket spring assemblies 54" along the openings 59" formed in the medial portions of the bracket spring assemblies 54".

In a fourth embodiment of the present invention, a plurality of spring bars 52'" can be provided, as illustrated in FIGS. 9–10. The stiffness of the plurality of spring bars 52'" combined, i.e., as illustrated in FIG. 9, is substantially similar to the stiffness of a single spring bar 52, i.e., as illustrated in a first embodiment of the present invention in FIG. 5. The plurality of spring bars 52'" also includes a plurality of bracket spring assemblies 54'" positioned spaced-apart along the plurality of elongate spring bars 52'". The plurality of spring bars 52'" extend substantially parallel to each other along substantially the entire length of the generator stator core 20'". The plurality of spring bars 52'" are advantageously connected to the plurality of bracket spring assemblies 54'" along end portions of the bracket spring assemblies 54'" so that the plurality of spring bars 52'" are positioned opposite each other and symmetrical along the bracket spring assemblies 54'". This configuration of the present invention is advantageous because each of the plurality of spring bars 52'" can advantageously have a lower stiffness than in the first embodiment of the present invention where only a single spring bar 52 per core supporter is included. This configuration also advantageously reduces vibration and eliminates lateral movement of the generator stator core 20'", low tunes the natural frequency of the generator stator core 20, and further advantageously stabilizes the power generation system 10'" during operation. This configuration still further advantageously compensates for tangential and radial forces associated with the "oval mode" condition experienced by the generator stator core 20'" during operation.

The key block brackets 60 are connected to the spring mounting frame 56 as illustrated in FIGS. 3–4. More particularly, the plurality of key block brackets 60 include first 61 and second 62 key block brackets. The first key block bracket 61 is positioned to connect to a first end portion of the spring mounting frame 56 and the second key block bracket 62 is positioned to connect to a second end portion of the spring mounting frame 56. The first key block bracket 61 preferably includes a first key block 64 and the second key block bracket 62 includes a second key block 64. The first and second key blocks 64 are positioned to matingly contact the first and second key block brackets 60.

One of the plurality of key blocks 64 is also positioned to contact one of the plurality of keybars 22 positioned along the outer peripheral portions of the generator stator core 20 and is further positioned to contact the stator core frame support 30. The plurality of key blocks 64 are positioned to contact portions of the generator stator core 20 and portions of the stator core frame support 30. As illustrated in FIGS. 3–5, each of the plurality of key block brackets 60 and each of the plurality of key blocks 64 includes openings 68 that align with one another. Each of the plurality of keybars 22 can also include a plurality of openings 68. The openings 68 in the key block brackets 60, the key blocks 64, and the keybars 22 can advantageously be threaded. When the openings 68 on the key blocks 64, the key block brackets 60, and the key bars 22 are aligned, a connection can be made between the generator stator core 20 and the stator core frame support 30 by positioning a connecting member 15 therethrough.

The connecting member 15 can advantageously be provided by a bolt, or another type of connecting assembly that can pass through portions of the key block bracket 60, the key block 64, and the key bar 22. The connecting member 15 can be any strong steel material that can withstand vibratory, radial, and vertical forces associated with the operation of the generator stator core 20 or lateral movement associated with transient faults. The connecting member 15 can also be threaded to thereby make a strong connection to the threaded openings 68 positioned on the key block 64, the key block brackets 60, and the key bar 22.

Figure 2:
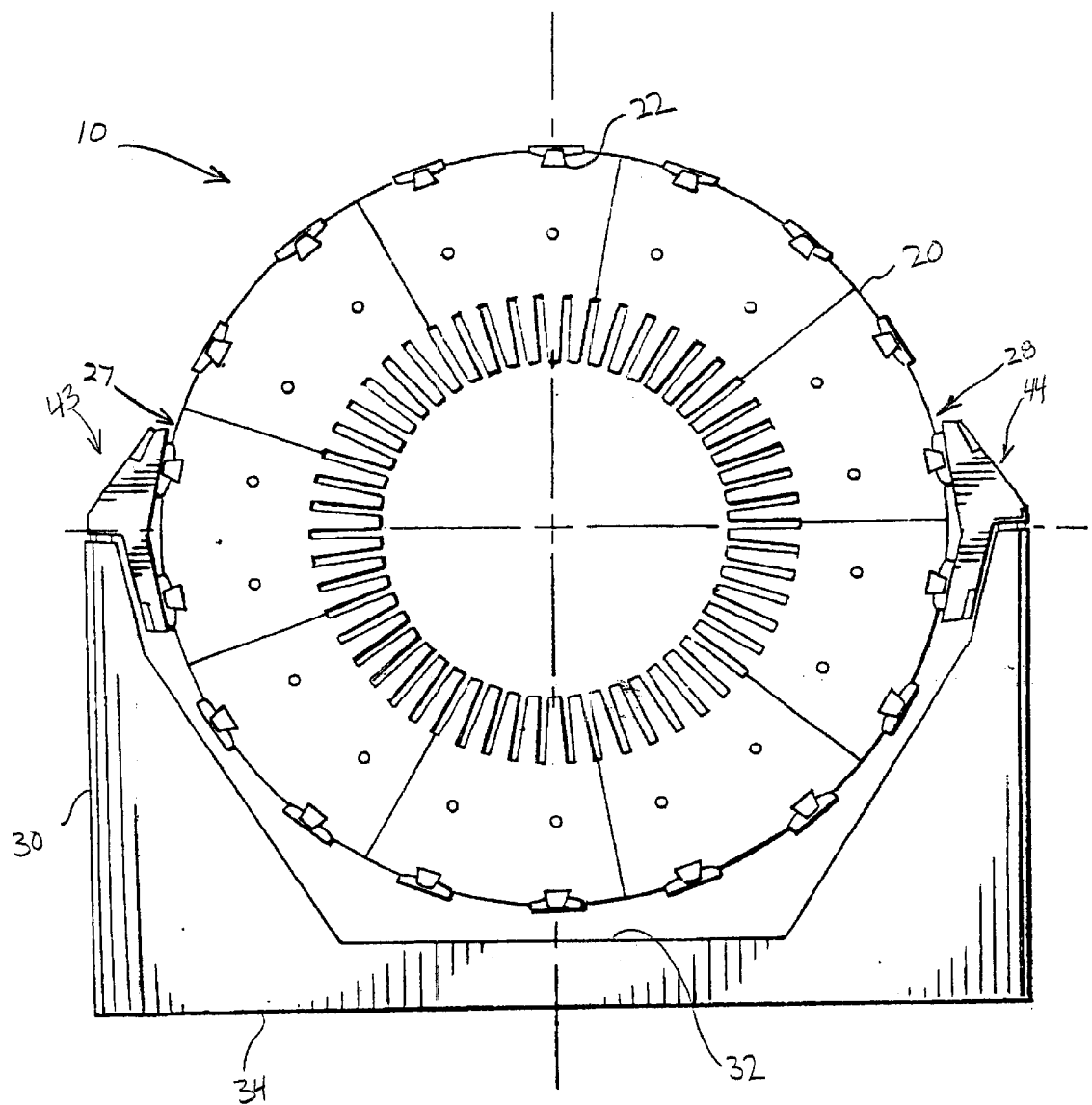
FIG. 2 is a sectional view of a power generation system including a power generator stator core and a stator core frame support taken along line 2—2 of FIG. 1 according to a first embodiment of the present invention.

The core supporter can advantageously be positioned to contact less than all of the keybars 22 positioned along outer peripheral portions of the generator stator core 20, as illustrated in FIG. 2. This configuration advantageously reduces cost and complexity of the power generation system 10 by low tuning the natural frequency of the generator stator core, relieving vibratory forces, preventing lateral movement and compensating for tangential and radial forces associated with the "oval mode" condition experienced by the generator stator core 20 during operation while simultaneously maintaining stability of the power generation system 10. Because the core supporter can be positioned to contact less than all of the keybars 22, the configuration is advantageously less expensive to manufacture and less time consuming to assemble.

As illustrated in FIGS. 3–5, a generator stator core support apparatus for stabilizing a power generation system 10 is also provided. The generator stator core support apparatus includes first 43 and second 44 core connecting means 42 for connecting the generator stator core 20 to a stator core frame support 30. The first core connecting means 43 is positioned to contact a first outer peripheral medial side portion 27 of the generator stator core 20 and is also positioned to contact a first upper medial side portion of the stator core frame support 30. The contact made between the first core connecting means 43 and the first upper medial side portion 27 of the stator core frame support 30 forms a connection between the first core connecting means 43 and the stator core frame support 30. This connection can be formed by a weld or any other connection between metal material that forms a strong bond that will not deteriorate over the life of the generator stator core 20.

The second core connecting means 44 is positioned to contact a second outer peripheral medial side portion 28 of the stator core frame support 30. The second outer peripheral medial side portion 28 of the stator core frame support 30 is positioned opposite the first outer peripheral medial side portion 27 of the stator core frame support 30. The contact between the second core connecting means 44 and the stator core frame support 30 also forms a connection between the second core connecting means 44 and the stator core frame support 30. This connection can also be a welded connection, or any other connection that forms a strong bond between metal materials.

The present invention provides a more efficient and cost effective power generation system 10 by low tuning the natural frequency of the generator stator core 20 while simultaneously maintaining stability of the power generation system 10. The stiffness of the stator core frame support 30 and biasing support member 50 is decreased, the generator stator core 20 can advantageously operate at a lower tuned natural frequency. Typical generator stator cores 20 can operate at frequencies higher than 60 hertz (HZ), while a low tuned generator stator core 20 operates at a natural frequency of less than 60 HZ. By providing a generator stator core 20 that operates at a lower tuned natural frequency, for example, between 10–25 HZ a smaller and more efficient stator core frame support 20 can advantageously be provided in a stable power generation system 10.

As shown in FIGS. 1–10, methods of stabilizing a power generation system 10, relieving vibration forces, eliminating lateral movement, and low tuning the natural frequency of a generator stator core 20 are also provided in the present invention. The method includes the step of attaching a first core supporter 43 to a first upper medial side portion of a stator core frame support 30. The first core supporter 43 preferably includes a biasing support member 50. The method still further includes the step of attaching a second core supporter 44 to a second medial side portion of the stator core frame support 30. The second core supporter 44 also includes a biasing support member 50. In turn, the biasing support member 50 preferably includes an elongate spring bar 52. The second upper medial side portion of the stator core frame support 30 is positioned opposite the first upper medial side portion of the stator core frame support 30. The first 43 and second 44 core supporters can advantageously be attached to the stator core frame support 30 by welding portions of the first 43 and second 44 core supporters to portions of the stator core frame support 30. The combination of the first 43 and second 44 core supporters are positioned substantially symmetrical along portions of the stator core frame support 30.

The method of stabilizing the power generation system 10, and low tuning the natural frequency of the generator stator core 20 by positioning the generator stator core 20 to overlie the stator core frame support 30 advantageously provides a more cost-efficient and less complex power generation system. The lower portion 24 of the generator stator core 20 is positioned to overlie the stator core frame support 30 so that the lower portion 24 of the generator stator core 20 can be positioned within the lower inner surface 32 of the stator core frame support 30 without contact between the lower portion of the generator stator core 20 and the stator core frame support 30.

The method of stabilizing the power generation system 10, reducing vibration, eliminating lateral movement and low tuning the natural frequency of the generator stator core 20 during operation still further includes connecting the generator stator core 20 to the first core supporter 43 along a first medial side portion 27 of the generator stator core 20 and further connecting the generator stator core 20 to the second core supporter 44 along a second medial side portion 28 of the generator stator core 20. These connections are made by using a plurality of connecting members 15. Each one of the plurality of connecting members 15 are positioned through each of the first 43 and second 44 vibration reducers 42 and into key bars 22 positioned along outer peripheral portions of the generator stator core 20.

The plurality of connecting members 15 can advantageously be provided by bolts, for example, or another type of connecting member that can contact each of the first 43 and second 44 core supporters and portions the key bars 22 positioned along outer peripheral portions of the generator stator core 20. Each of the plurality of connecting members 15 can advantageously be steel, or another metal material having strength properties capable of withstanding the vibratory forces and lateral movement associated with transient faults and tangential and radial forces associated with the "oval mode" condition experienced by the generator stator core 20 during operation.

The combination of the plurality of connecting members 15 and the first 43 and second 44 core supporters in contact with the first 27 and second 28 medial side portions of the generator stator core 20 form a connection between the generator stator core 20 and the stator core frame support 30 that advantageously further provides stabilization to the power generation system 10 during operation of the generator stator 20, reduces vibration, eliminates lateral movement and low tunes the natural frequency of the generator stator core 20.

The method still further includes attaching a plurality of keybars 22 to outer peripheral portions of the generator stator core 20 and positioning the keybars 22 spaced-apart along the outer peripheral portions of the generator stator core 20. Each of the plurality of keybars 22 has a portion that includes a dovetail shape 26. Each of the plurality of keybars 22 slidably contacts a dovetail slot 26 formed in the outer peripheral portion of the generator stator core 20. The method also includes contacting the keybars 22 with the first 43 and second 44 core supporters 42 to thereby connect the generator stator core 20 to the stator core frame support 30. The step of connecting the keybars 22 to the core supporters 42 advantageously stabilizes the power generation system 10 during operation.

The step of connecting core supporters 42 to the generator stator core 20 can advantageously be accomplished by connecting the core supporters 42 to less than all of the keybars 22. Furthermore, the step of connecting the core supporters 42 to the generator stator core 20 can also include connecting only the core supporters 42 to keybars 22 positioned along medial side portions of the generator stator core 20 so that there is no connection between the generator stator core 20 and the stator core frame support 30 along bottom surfaces of the generator stator core 20. This method can still further include connecting the core supporters 42 to the key bars 22 positioned along medial side portions of the generator stator core 20 so that there is no connection between the generator stator core 20 and the stator core frame support 30 along upper surfaces of the generator stator core 20. This provides an interstitial space between the lower end portion 24 of the generator stator core 20 and the lower inner surface 32 of the stator core frame support 30 and between the upper surface of the generator stator core 20 and the stator core frame support 30 that advantageously eliminates lateral forces and reduces vibration of the generator stator core 20 associated with transient faults. The interstitial space also compensates for tangential and radial fores associated with the "oval mode" condition experienced by the generator stator core 20 during operation. The interstitial space provided by the present invention still further stabilizes the power generation system 10 and low tunes the natural frequency of the generator stator core 20.

The method of stabilizing the power generation system 10 during operation also includes extending the first core supporter 43 substantially parallel to the second core supporter 44, substantially the entire length of the generator stator core 20. The method further includes attaching a plurality of bracket spring assemblies 54 to the elongate spring bar 52. The elongate spring bar 52 can advantageously be a strong steel material. Each of the plurality of bracket spring assemblies 54 includes a spring mounting frame 56.

The method still further includes attaching first 61 and second 62 key block brackets to the spring mounting frame 56. The first key block bracket 61 includes a first key block 64 and the second key block bracket 62 includes a second key block 64. The method further includes matingly contacting each of the first and second key blocks 64 with each of the first 61 and second 62 key block brackets, and connecting the first key block bracket 61 to a first end portion of the spring mounting frame 56 and the second key block bracket 62 to a second end portion of the spring mounting frame 56. The first and second end portions of the spring mounting frame 56 are positioned opposite each other. The method still further includes connecting one of the plurality of key blocks 64 to a portion of one of the plurality keybars 22 positioned along outer peripheral portions of the generator stator core 20. The key block 64 is positioned to connect the stator core frame support 30 to the generator stator core 20.

This method of stabilizing the power generation system 10 provides an interstitial space between the upper and lower end portions of the generator stator core 20 and the stator core frame support 30 and low tunes the natural frequency of the generator stator core 20 advantageously relieving vibratory forces associated with operation of the generator stator core 20. The method further eliminates lateral movement associated with transient faults that occur during operation of the generator stator core 20. The method of stabilizing the power generation system 10 during operation of the generator stator core 20 advantageously reduces the size of the stator core frame support 30, thereby reducing costs associated with providing a stator core frame support 30. The reduced size of the stator core frame support 30 advantageously reduces the path of a load traveling from the generator stator core 20. Furthermore, the method advantageously allows a user or manufacturer to construct the generator stator core 20 and the stator core frame support 30 separately. When the manufacturer constructs the generator stator core 20 and the stator core frame support 30 separately, instead of simultaneously, the manufacturer is provided with more flexibility in time and cost associated with constructing the generator stator core 20 and the stator core frame support 30.

In the drawings and specification, there have been disclosed embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A power generation system comprising:
   a stator core frame support member having a lower inner surface portion and a lower outer surface portion, the lower outer surface portion positioned to contact a support surface;
   a generator stator core including a plurality of keybars positioned spaced-apart and extending along outer peripheral portions of the generator stator core, the generator stator core positioned to overlie the lower inner surface portion of the stator core frame support member and further having a lower end portion positioned spaced-apart from and not in contact with bottom portions of the lower inner surface portion of the frame support member; and
   a core supporter connected to the stator core frame support member and positioned to contact the plurality of keybars along outer side peripheries of the generator stator core, the core supporter having first and second core connecting means for connecting the stator core frame support member to the generator stator core to thereby low tune the natural frequency of the generator stator core and further stabilize the power generation system during operation, the first core connecting means being connected to a first medial side outer peripheral portion of the generator stator core and the second core connecting means being connected to a second medial side outer peripheral portion of the generator stator core and positioned opposite the first medial side outer peripheral portion of the generator stator core so that the first and second core connecting means are positioned substantially symmetrical about opposite medial side portions of the generator stator core.

2. The power generation system as defined in claim 1, wherein the generator stator core further comprises a substantially annular shape, the stator core frame support member further comprises a substantially semi-annular shape, and the plurality of keybars further comprises less than eight keybars positioned spaced-apart and extending along outer peripheral portions of the generator stator core.

3. The power generation system as defined in claim 1, further comprising at least two keybars positioned spaced-apart along a first outer peripheral side portion of the generator stator core, and further comprising at least another two keybars positioned spaced-apart along a second side outer peripheral side portion of the generator stator core, the second outer peripheral side portion of the generator stator core positioned opposite from and substantially symmetrical to the first outer peripheral side portion of the generator stator core.

4. The power generation system as defined in claim 1, wherein the core supporter is further positioned to contact less than all of the keybars positioned along the outer side peripheries of the generator stator core.

5. The power generation system as defined in claim 4, wherein the first core connecting means is positioned to extend substantially parallel to the second core connecting means substantially the entire length of the generator stator core, and wherein each of the first and second core connecting means further comprises at least one biasing support member positioned to connect the stator core frame support member with the generator stator core.

6. The power generation system as defined in claim 5, wherein the at least one biasing support member further comprises an elongate spring bar and a plurality of bracket spring assemblies connected to and positioned spaced-apart along the elongate spring bar, each of the plurality of bracket spring assemblies comprising a spring mounting frame and a plurality of spaced-apart key block brackets connected to the spring mounting frame.

7. The power generation system as defined in claim 6, wherein the plurality of key block brackets further comprise first and second key block brackets, and wherein the first key block bracket further comprises a first key block and the second key block bracket further comprises a second key block, the first and second key blocks positioned to matingly contact the first and second key block brackets, and wherein the first key block bracket is positioned to connect to a first end portion of the spring mounting frame and the second key block bracket is positioned to connect to a second end portion of the spring mounting frame, opposite the first end portion of the spring mounting frame.

8. The power generation system as defined in claim 7, wherein one of the plurality of key blocks is connected to one of the plurality of keybars positioned along the outer peripheral portions of the generator stator core, each one of the plurality of key blocks positioned to connect the stator core frame support member to the generator stator core to thereby low tune the natural frequency of the generator stator core and stabilize the power generation system during operation.

9. The power generation system as defined in claim 5, wherein the at least one biasing support member further comprises a plurality of elongate spring bars, the plurality of spring bars positioned substantially parallel along the at least one biasing support member, the plurality of spring bars further comprising a plurality of bracket spring assemblies connected thereto and positioned spaced-apart along the plurality of spring bars, each of the bracket spring assemblies comprising a spring mounting frame and a plurality of spaced-apart key block brackets connected to the spring mounting frame.

10. A generator stator core support apparatus comprising:
first core connecting means for connecting the generator stator core to a stator core frame support when the generator stator core is positioned to overlie lower inner surface portions of the stator core frame support, the first core connecting means positioned to contact a first outer peripheral medial side portion of the generator stator core and a first upper medial side portion of the stator core frame support; and
second core connecting means for connecting the generator stator core to the stator core frame support, the second core connecting means positioned to contact a second outer peripheral medial side portion of the generator stator core positioned opposite the first outer peripheral medial side portion of the generator stator core, and further positioned to contact a second upper medial side portion of the stator core frame support positioned opposite the first upper medial portion of the stator core frame support, the combination of the first and second core connecting means positioned to support the generator stator core when connected thereto without a support contact between a lower or upper end portion of the generator stator core and the inner surface of the stator core frame support.

11. The generator stator core support apparatus as defined in claim 10, wherein the first core connecting means is positioned to extend substantially parallel to the second core connecting means substantially the longitudinal length of the generator stator core, and wherein each of the first and second core connecting means further comprises a support member positioned to connect the stator core frame support with the generator stator core.

12. The generator stator core support apparatus as defined in claim 11, wherein the support member further comprises an elongate spring bar and a plurality of bracket spring assemblies connected to and positioned spaced-apart along the elongate spring bar, and wherein the plurality of bracket spring assemblies further comprises a spring mounting frame and a plurality of spaced-apart key block brackets connected thereto.

13. The generator stator core support apparatus as defined in claim 12, wherein each of the plurality of key block brackets further comprises first and second key block brackets, and wherein the first key block bracket further comprises a first key block and the second key block bracket further comprises a second key block, the first and second key blocks positioned to matingly contact the first and second key block brackets, and wherein the first key block bracket is positioned to connect to a first end portion of the spring mounting frame and the second key block bracket is positioned to connect to a second end portion of the spring mounting frame, opposite the first end portion of the spring mounting frame.

14. The generator stator core support apparatus as defined in claim 13, wherein one of the plurality of key blocks is positioned to connect to one of a plurality of keybars positioned along outer peripheral portions of the generator stator core, the key block further positioned to connect the generator stator core frame support to the generator stator core.

15. The generator stator core support apparatus as defined in claim 11, wherein the biasing support member further comprises a plurality of elongate spring bars positioned parallel along the support member and comprising a plurality of bracket spring assemblies positioned spaced-apart to connect thereto, each of the bracket spring assemblies comprising a spring mounting frame and a plurality of spaced-apart key block brackets connected thereto.

16. A machine support apparatus comprising:
first connecting means for connecting the machine to a frame support when the machine is positioned to overlie inner surface portions of the frame support, the first connecting means positioned to contact a first outer peripheral medial side portion of the machine and further positioned to contact a first medial side portion of the frame support; and
second connecting means positioned to contact a second outer peripheral medial side portion of the machine positioned opposite the first outer peripheral medial side portion of the machine, and further positioned to contact a second upper medial side portion of the frame support positioned opposite the first upper medial portion of the frame support, for connecting the machine to the frame support, the combination of the first and second connecting means further positioned to support the machine when connected thereto without a support contact between a lower or upper end portion of the machine and the inner surface of the frame support;

the first connecting means further positioned to extend substantially parallel to the second connecting means substantially the length of the machine, and wherein each of the first and second connecting means further comprises a support positioned to connect the frame support member with the machine;

the support member further comprising a plurality of elongate spring bars positioned parallel along the support member and comprising a plurality of bracket spring assemblies connect thereto and positioned spaced-apart, each of the bracket spring assemblies comprising a spring mounting frame and a plurality of spaced-apart key block brackets connected thereto.

17. The machine support apparatus as defined in claim 16, wherein the support member further comprises an elongate spring bar and a plurality of bracket spring assemblies connected to and positioned spaced-apart along the elongate spring bar, and wherein each of the plurality of bracket spring assemblies further comprises a spring mounting frame and a plurality of spaced-apart key block brackets connected to the spring mounting frame.

18. The machine support apparatus as defined in claim 17, wherein the plurality of key block brackets further comprises first and second key block brackets, and wherein the first key block bracket further comprises a first key block and the second key block bracket further comprises a second key block, the first and second key blocks positioned to matingly contact the first and second key block brackets.

19. The machine support apparatus as defined in claim 18, wherein the first key block bracket is positioned to connect to a first end portion of the spring mounting frame and the second key block bracket is positioned to connect to a second end portion of the spring mounting frame opposite the first end portion of the spring mounting frame, and wherein one of the plurality of key blocks is positioned to connect to one of a plurality of keybars positioned along outer peripheral portions of the machine, the key block further positioned to connect the frame support to the machine.

20. A stator core biasing support member for a power generation system stabilizer, the biasing support member comprising:

an elongate spring bar positioned to connect to a stator core frame support and having a length substantially equal to the longitudinal length of a generator stator core having a plurality of keybars; and a plurality of bracket spring assemblies connected to and positioned spaced-apart along portions of the elongate spring bar and positioned to connect to the plurality of keybars of the stator core.

21. The stator core biasing support member as defined in claim 20, further comprising a plurality of elongate spring bars positioned to connect to the stator core frame support member, the plurality of spring bars having a length substantially equal to the longitudinal length of the generator stator core and extending parallel along portions of the generator stator core.

22. The stator core biasing support member as defined in claim 20, wherein the plurality of bracket spring assemblies further comprises a spring mounting frame comprising a plurality of spaced-apart key block brackets connected thereto.

23. The stator core biasing support member as defined in claim 22, wherein the plurality of key block brackets further comprises first and second key block brackets, and wherein the first key block bracket further comprises a first key block and the second key block bracket further comprises a second key block, the first and second key blocks positioned to matingly contact the first and second key block brackets.

24. The stator core biasing support member as defined in claim 23, wherein the first key block bracket is positioned to connect to a first end portion of the spring mounting frame and the second key block bracket is positioned to connect to a second end portion of the spring mounting frame, opposite said first end portion of the spring mounting frame.

25. The stator core biasing support member as defined in claim 24, wherein one of the plurality of key blocks is connected to one of a plurality of keybars positioned along outer peripheral portions of the generator stator core, each one of the plurality of key blocks positioned to connect the stator core frame support to the generator stator core to thereby low tune the natural frequency of the generator stator core and stabilize the power generation system during operation.

* * * * *